United States Patent [19]
Jenkins

[11] 3,912,202
[45] Oct. 14, 1975

[54] SIDE FORCE CONTROL FOR AIRPLANES
[75] Inventor: Michael W. M. Jenkins, Marietta, Ga.
[73] Assignee: Lockheed Aircraft Corporation, Burbank, Calif.
[22] Filed: June 17, 1974
[21] Appl. No.: 479,878

[52] U.S. Cl. .............. 244/52; 244/12 D; 244/75 R; 244/83 R
[51] Int. Cl.² ........................................ B64B 15/08
[58] Field of Search ............ 244/52, 51, 75 R, 90 R, 244/103 W, 12 A, 83 R, 12 D, 23 D, 23 A; 60/230

[56] References Cited
UNITED STATES PATENTS

| | | | |
|---|---|---|---|
| 2,676,770 | 4/1954 | Schuck | 244/51 X |
| 2,699,687 | 1/1955 | Crandall | 244/90 R X |
| 3,086,731 | 4/1963 | Beckington | 244/52 |
| 3,155,346 | 11/1964 | Charlton et al. | 244/90 R X |
| 3,281,082 | 10/1966 | Kerry | 244/52 X |

Primary Examiner—George E. A. Halvosa
Assistant Examiner—Galen L. Barefoot
Attorney, Agent, or Firm—Billy G. Corber; John J. Sullivan

[57] ABSTRACT

This invention proposes to minimize the roll control requirements of airplanes at low speeds and to trim the airplane in crosswind landings by means of applying side forces on the airplane which are generated by lateral vectoring of the cruise engines. This is accomplished through the use of deflectors at the aft end of the engines which are angularly adjustable in unison through control linkage integrated with the operation of the existing, conventional control surfaces of the airplane.

6 Claims, 7 Drawing Figures

SIDE FORCE CONTROL FOR AIRPLANES

This invention relates generally to flight control devices for airplanes and more particularly to such a device designed and adapted for operation during landing of the airplane whereby a direct sideforce is applied on the airplne to augment the airplane's roll control mechanism and/or to trim the airplane laterally in crosswind landings.

While not limited to, the present invention is especially useful on airplanes having short take-off and landing (STOL) capability in which the influence of crosswinds in the landing approach is considerably more pronounced than with conventional airplanes (CTOL). In addition the speed of STOL airplanes during the landing approach is considerably slower than CTOL airplanes and, therefore, aerodynamic control force generation at the slower speed is also more difficult to achieve.

This lateral motion capability is necessary for the initial acquisition and holding of the runway centerline and for the correction of inadvertent flight path excursions especially during crosswind landings. In the past the primary control for lateral translation has been the aileron with directional control used for coordination and for maintaining heading.

Generally, a pilot controls a crosswind landing through a "crabbed" approach or a slide-slipping approach, and sometimes a combination of the two is used. During a crabbed approach the airplane is nosed into the crosswind with no side slip and with wings level. To avoid excessive side loads on the landing gear, the crab angle must be removed just prior to touchdown. In the side-slipping approach, the airplane is lined up with the runway, i.e., heading parallel to the runway centerline and the airplane is landed one wing low to balance side slip. In both landing techniques, one objective is to touch down with zero lateral velocity relative to the runway.

As stated above, the landing approach speeds of STOL airplanes are low compared with CTOL airplanes. Therefore, for the same crosswind component, a STOL airplane may have to develop nearly twice the side slip capability that the CTOL requires. To compound this problem, the pilot of a STOL airplane may not have an alternative runway choice in order to minimize the prevailing crosswind component. In this instance, even larger banks or crab angles on approach may become necessary in routine landing approaches unless alternate means of cancelling the crosswind induced side force is found.

The use of direct side force as herein proposed offers this alternative and also provides a handling quality advantage in the latter phase of the landing. If direct side force is not used, then the excessive side-slip or crab angles or a combination of both must be removed prior to touchdown. It is felt that this maneuver may induce an excessive workload on the pilot who is already taxed with hitting a precise spot on the relatively short STOL runway. The use of direct side force control removes this problem by permitting the airplane to apporach lined-up with the heading parallel to the runway with the wings level.

The present invention proposes to generate direct side force by lateral vectoring of a high thrust magnitude without significantly detracting from the longitudinal resultant force. The side force so generated is relatively independent of speed at low speed and results in a reduced requirement for roll control power. In fact, it is contemplated that the roll power requirement is reduced down to that value sufficient for control of turbulent response at low speed. With the resulting combined roll and side force capability more effective and positive control of the flight path at low speed can be achieved. Moreover, more effective use of installed power is possible and a safer and better handling vehicle results.

To the above ends, the direct side force is generated by laterally vectoring, in effect, the cruise engines. More specifically, this is accomplished by means of and through exhaust deflectors adjacent the aft end of the engines to direct the exhaust gases in the desired direction. Each exhaust deflector is powered by an actuator energized by remote control means located in the cockpit of the airplane under the control of the pilot.

The proposed system is organized and arranged for use in two independent modes of flight. The first uses direct sideforce control as a supplement to (or part replacement of) the normal roll control provided by ailerons and spoilers. The second employs a bias signal to cater for landings in a crosswind. Both operations are fully automatic in that they are each integrated with existing on-board systems of the airplane so as to function in conjunction with such systems requiring no special or separate attention of the pilot.

With the above and other objects in view as will become apparent, this invention consists in the construction, combination and arrangement of parts, all as hereinafter more fully described, claimed and illustrated in the accompanying drawings, wherein:

Figure 1:
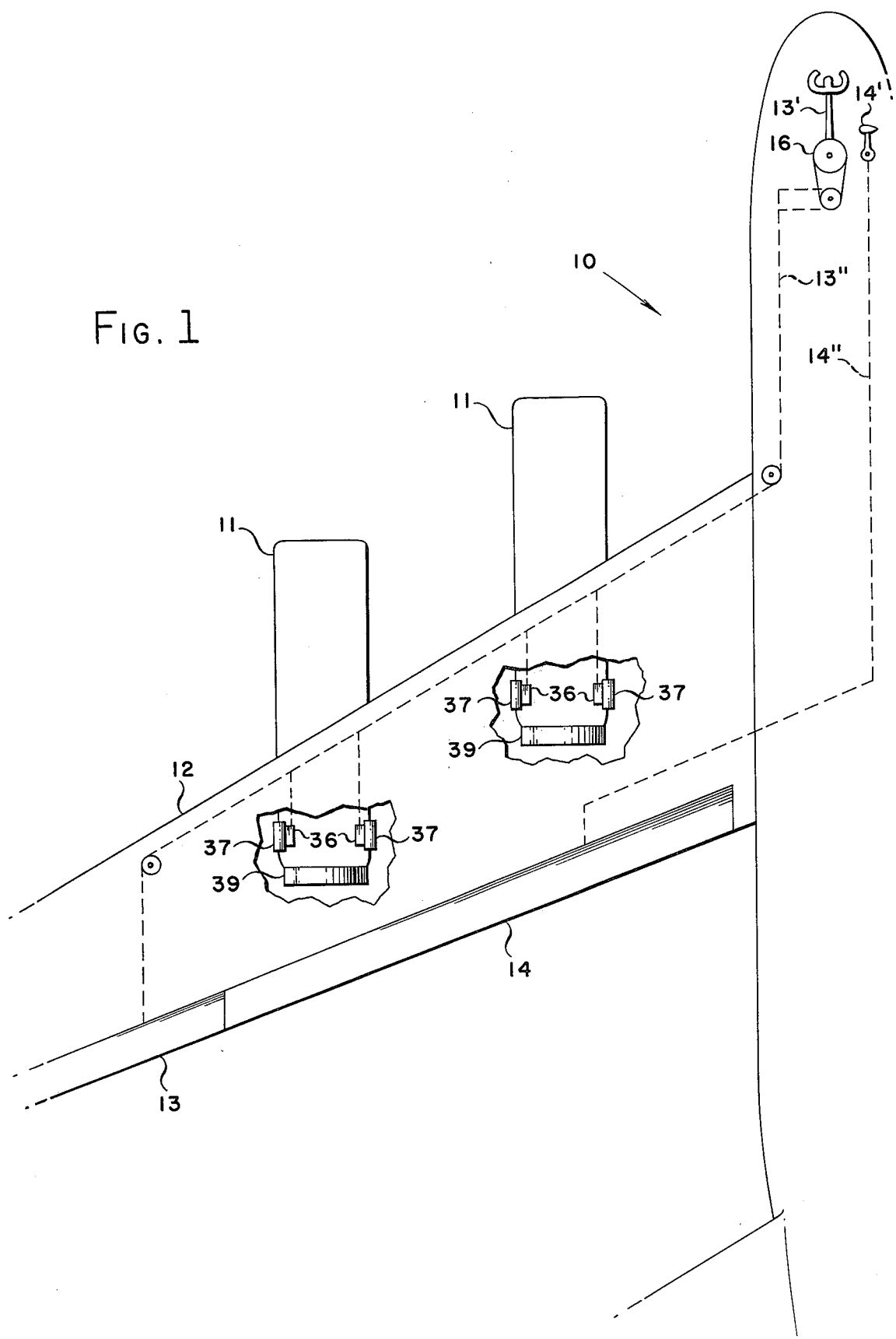
FIG. 1 is a plan view of one symmetrical half of a typical four-engine airplane modified to include a side force control in accordance with the teachings of this invention to show the overall arrangement thereof including a schematic of the system by which it is activated.
Figure 2:
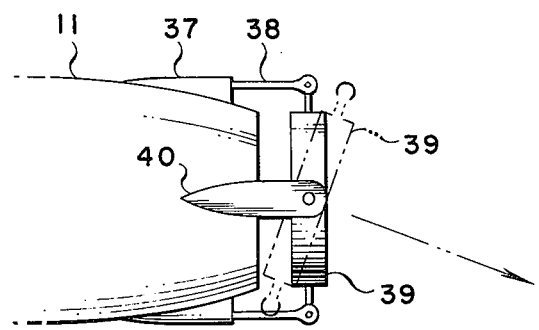
FIG. 2 is a plan view of the aft end of one of the engines to show primarily the mounting of the deflector associated with each engine and operative to direct the side force to be applied to the airplane during landing.
Figure 3:
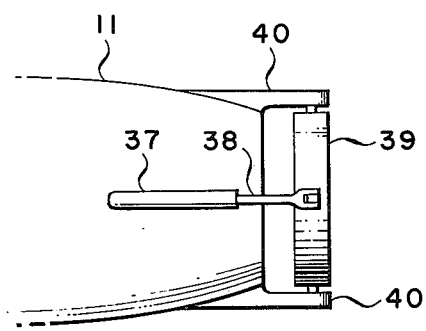
FIG. 3 is a view taken at 90° to FIG. 2, i.e., a side view of one of the engines.

Referring more particularly to the drawings, 10 designates an airplane powered by four jet engines 11, two mounted on each wing 12. Typically, control surfaces in the form of an aileron 13 and a flap 14 are provided on each wing 12. These ailerons 13 or flaps 14 are operable from the cockpit or cabin by means of or through respective control levers 13' and 14' and interconnecting linkage 13'' and 14''.

More specifically, the pilot's control lever 13' is connected to the aileron 13 on each wing 12 through a series of pulleys 16 and cables 17 balanced through a centering device such as spring 16'. Thus movement of the lever 13' by the pilot in either direction effects an angular deflection of the ailerons 13 on opposite wings 12 accordingly in equal and opposite directions. This in turn causes the airplane 10 to bank to the left or right.

The pilot's control lever 14' is connected to the flaps 14 on each wing 12 through a series of bellcranks 18 and push-pull rods 19. Thus, movement of the lever 14' by the pilot causes the flaps 14 to move from neutral corresponding to the cruise position to deflection downward corresponding to the low speed or landing position.

Figure 5:
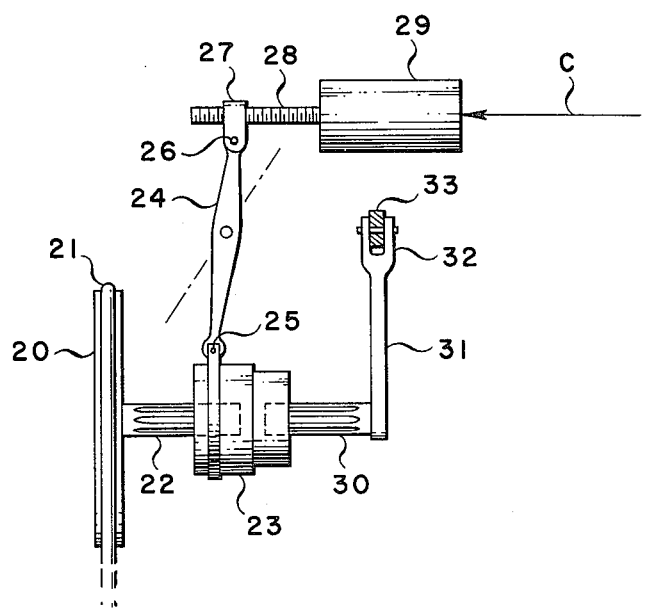
FIG. 5 is a view taken along the line 5—5 of FIG. 4 to show the mechanism to engage and disengage the side force control with the associated flight control system of the airplane.

The side force control herein proposed is integrated into the foregoing surface control system by means of and through a pulley 20 and cables 21 (FIG. 4), forming a closed loop on one of the pulleys 16 in the aileron drive system. The pulley 20 is mounted on and drives a splined shaft 22 (FIG. 5) on which a collar 23 having mating spline engaging grooves is mounted for relatively unrestricted linear movement. Such movement of the collar 23 is effected by a centrally pivoted arm 24 connected at opposite ends through a swivel joint or universal 25 and 26 to the collar 23 and a nut 27 respectively. The nut 27 is mounted on a threaded shaft 28 which is the shaft of an electric motor or screw jack 29.

A driven splined shaft 30 is axially aligned with the pulley shaft 22 and adapted to engage the internally grooved collar 23 when it moves outwardly on the shaft 22 under the force applied by the screw jack 29. Thus, a clutch is provided between the shafts 22 and 30 whereby they are engaged to rotate as a unit and disengaged to allow the shaft 22 to rotate independently of the shaft 30. This engagement and disengagement of the clutch is effected through an electrical signal which energizes the screw jack 29. Such signal is transmitted through a conductor "C" from a switch "S" in the cockpit adjacent the pilot's control lever 14' to the screw jack 29. This switch "S" is located so as to be automatically engaged by the lever 14' when moved to the landing flap position, i.e., downward deflection.

At its opposite end the shaft 30 carries a laterally extending arm or lever 31, the outer end of which terminates in a fork 32 adapted to receive and pivotally connect a push-pull rod 33 medially of its length. This rod 33 is thereby disposed at right angles to the lever 31 and pivotally connects one arm of a series of four bellcrank levers 34 at spaced distances along its length. The other arm of each bellcrank 34 pivotally connects the end of a reciprocable rod 35 which constitutes the control rod of a valve 36 for a pair of actuators 37.

Each pair of actuators 37 is associated with one of the engines 11 being mounted one on each side of its engine 11 at the aft end thereof. Preferably these actuators 37 are all hydraulic cylinders, each having a piston rod 38 that extends therefrom and contracts under the force of fluid as controlled by its valve 36. Each pair of piston rods 38 associated with each engine 11 pivotally connects at its outer end to an engine exhaust ring 39 at the aft end of the engine exhaust nozzle to which it is pivotally connected top and bottom as at 40. Each ring 39 is thereby rotatable about a vertical axis with respect to the plane of the longitudinal dimension of the airplane 10. As such, each ring 39 constitutes a deflector and the engine exhaust discharge may be thereby directed at an angle preferably on the order of 20 degrees to either side of the airplane 10.

In view of the foregoing structure and arrangement, it is apparent that under normal operation of the airplane 10 movement of the pilot's levers 13' and 14' has the effect of adjusting the ailerons 13 and flaps 14 respectively in the conventional manner; however, upon movement of the flap control lever 14' to a position where it contacts the switch "S" actuating screw jack 29 the clutch 23–30 engages the push-pull rod 33 with the flight control linkage 13" to the aileron 13. Thereafter continued operation of the aileron 13 through its control lever 13' concurrently causes an adjustment of the several engine actuator valves 36 for the corresponding adjustment of the several engine exhaust rings 39 whereby the exhaust discharge is directed as a side force reaction on the airplane 10 augmenting the aileron deflection.

Superimposed on the above described system is a control link "L" from the localizer antenna (not shown) on the aircraft 10 to the several actuator control valves 36. As the localizer antenna picks up ground signals indicating the angle of the runway centerline with respect to the lateral displacement of the airplane 10 such divergency is transmitted simultaneously to the several actuator valves 36 causing an operation of the several actuators 37 in unison to adjust the engine exhaust rings 39 accordingly to compensate for such divergence. In this manner crosswind effect variations are negated.

Figure 4:
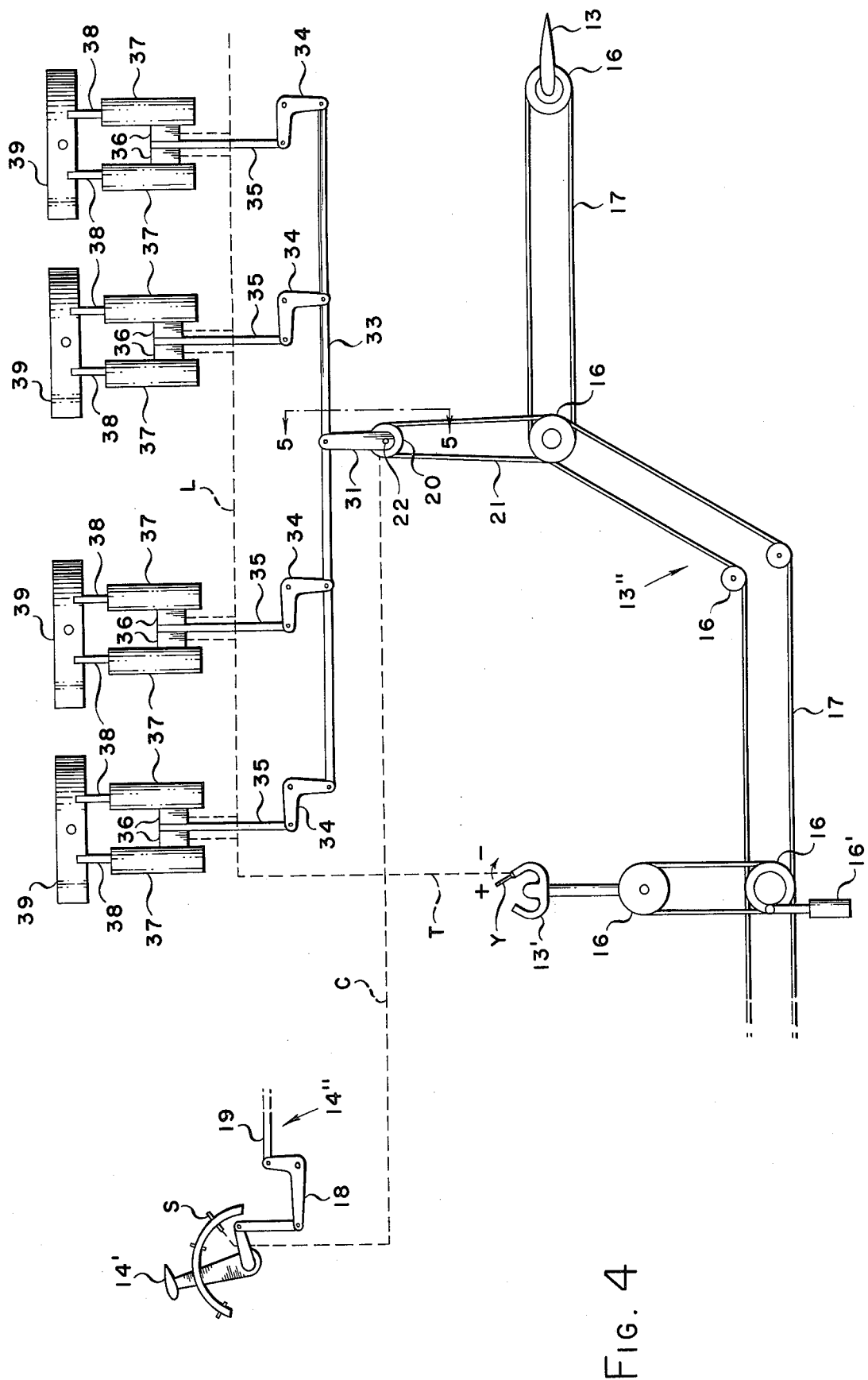
FIG. 4 is a schematic of the entire flight control system of the airplane in which the present side force control is integrated for automatic operation.

In addition there is included a control link "T" from the trim switch or slide button "Y" which for convenience may be located on the pilot's control lever 13' to the several actuator control valves 36. When the button "Y" is pressed a signal is transmitted through the link "T" to operate the several cylinders 37 in unison to adjust all of the exhaust rings 39 accordingly. As indicated in FIG. 4, the button "Y" is a two directional switch to permit the selective operation of either actuator 37 associated with each engine exhaust ring 39. As the pilot senses strong crosswind effects on the aircraft 10 through lateral drift from the desired flight path he can push the button "Y" in the appropriate direction and energize the link "T" until such drift is cancelled. Thus, the pilot may negate crosswind effects.

Figure 6:
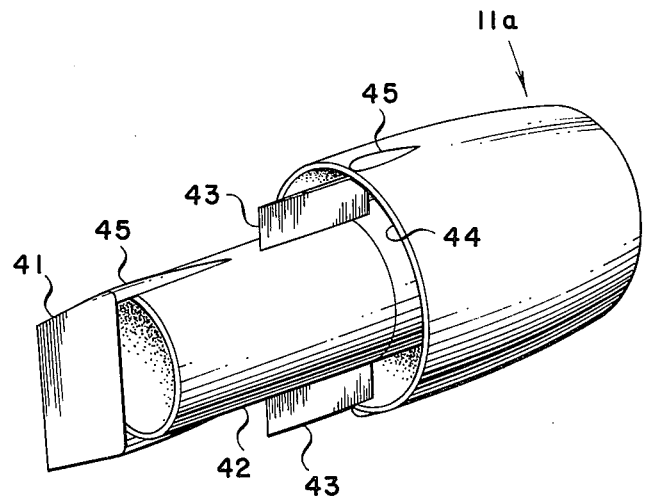
FIG. 6 is a perspective view of an alternative form of deflector to direct the side force and the mounting thereof at the aft end of the associated engine, in this case a fan jet engine.
Figure 7:
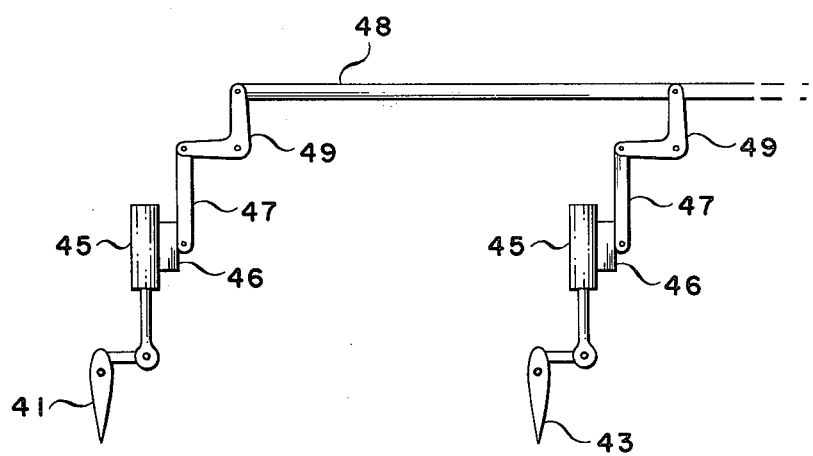
FIG. 7 is a schematic of the operating mechanism by which the alternative side force control shown in FIG. 6 is activated.

Referring more specifically now to FIGS. 6 and 7, there is shown an alternative form of side force control. In this arrangement, an exhaust vane 41 is located at the aft end of the exhaust nozzle 42 of the fan jet engine 11a being disposed in a vertical position. Also diametrically opposed vanes 43 are located across the by-pass air duct 44 which are disposed in alignment with the engine exhaust vane 41. All such vanes 41 and 43 are pivoted top and bottom of the associated engine 11 for rotation about a vertical axis. A power actuator, preferably a hydraulic cylinder 45, is associated with the inner end of each such vane 41 and 43 and includes a control valve 46 which is activated by a control rod 47 connected to a common push-pull rod 48 through a bellcrank 49. Thus, upon operation of the push-pull rod 48 the several bellcranks 49 and control rods 47 to the several actuators 45 are moved in unison causing the concurrent deflection of the several vanes 41 and 43 in substantially the same manner as that heretofore described in connection with the other form of the invention. The push-pull rod 48 of this alternate system is similarly connected to the flight surface control systems 13" and 14" as that previously described.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A side force control for an airplane having at least one fan jet engine with a by-pass air duct and pilot operated ailerons and flaps to control flight maneuvers of the airplane, comprising:
    a deflector mounted adjacent the aft end of each engine for pivotal movement about a vertical axis with respect to the line of flight of the airplane, each said deflector including a single vane pivotally connected to and extending aft from each engine exhaust nozzle and a pair of diametrically opposed vanes pivotally connected to and extending aft from said by-pass air duct;
    an actuator operatively connected to each deflector to effect the pivotal movement aforesaid whereby the angular position of said deflector is adjusted and the engine exhaust is direct accordingly thereby, each said actuator including a hydraulic cylinder carried by the associated engine with the extendable and retractable outer end thereof pivotally connected to one end of each said vane;
    a normally disengaged connection between each said actuator and the pilot operated ailerons aforesaid; and
    a clutch operable upon movement of said flaps by the pilot to a predetermined position to engage said normally disengaged connection whereby each said deflector is angularly adjusted thereafter concurrently with the movement of said ailerons.

2. The control of claim 1 wherein each said actuator has an opening range sufficient to adjust its associated deflector up to about 20° in each direction with respect to the vertical axis aforesaid.

3. The invention of claim 1 wherein said airplane has multiple engines and including a connection between the several actuators aforesaid for the operation thereof in unison.

4. The control of claim 1 including a control link operatively connecting each said actuator with an overriding pilot operated control device to energize each said actuator.

5. A side force control for an airplane having pilot operated ailerons and flaps to control flight maneuvers of the airplane, comprising:
    a deflector mounted adjacent the aft end of each engine exhaust nozzle for pivotal movement about a vertical axis with respect to the line of flight of the airplane;
    an actuator operatively connected to each deflector to effect the pivotal movement aforesaid whereby the angular position of said deflector is adjusted and the engine exhaust is directed accordingly thereby;
    a normally disengaged connection bettween each said actuator and the pilot operated ailerons aforesaid, said normally disengaged connection including a pair of splined, axially aligned shafts one connected to said ailerons and the other to each said actuator and a collar keyed to one of said shafts only for rotation in unison therewith;
    a clutch operable upon movement of said flaps by the pilot to a predetermined position to engage said normally disengaged connection whereby each said deflector is angularly adjusted thereafter concurrently with the movement of said ailerons, said clutch including a drive operatively connected to said collar for the linear movement thereof relative to said axially aligned shafts whereby said collar is keyed to both of said shafts; and
    a control link operatively connected between said flaps and said drive.

6. The control of claim 5 wherein each said deflector includes a ring pivotally connected to each engine exhaust nozzle at the top and bottom thereof and extending aft therefrom, and each said actuator includes at least one hydraulic cylinder carried by each engine, the extendable and retractable outer end of which is pivotally connected to said ring between its pivotal connection to said nozzle aforesaid.

* * * * *